United States Patent
Kuo et al.

(10) Patent No.: US 6,226,040 B1
(45) Date of Patent: May 1, 2001

(54) APPARATUS FOR CONVERTING VIDEO SIGNAL

(75) Inventors: Chung-Song Kuo; Yung-Che Chang; Kun-Chou Chen; Hsien-Wen Cheng, all of Taipei (TW)

(73) Assignees: Avermedia Technologies, Inc. (Taiwan Company), Taipei (TW); Avermedia Technologies, Inc. (U.S.A. Company), Fremont, CA (US)

( * ) Notice: Subject to any disclaimer, the term of this patent is extended or adjusted under 35 U.S.C. 154(b) by 0 days.

(21) Appl. No.: 09/059,683

(22) Filed: Apr. 14, 1998

(51) Int. Cl.[7] .............................. H04N 7/01; H04N 5/44; H04N 5/14; H04N 9/64; H04N 9/74

(52) U.S. Cl. .................... 348/446; 348/441; 348/561; 348/562; 348/565; 348/576; 348/577; 348/581; 348/582; 345/127; 345/145; 345/146; 345/147; 345/150; 345/212

(58) Field of Search ........................... 348/441, 446, 348/561, 562, 565, 576, 577, 581, 582; 345/127, 145, 146, 147, 150, 212

(56) References Cited

U.S. PATENT DOCUMENTS

| | | | |
|---|---|---|---|
| 5,532,719 | * 7/1996 | Kikinis | 345/211 |
| 5,606,374 | * 2/1997 | Bertran | 348/565 |
| 5,610,653 | * 3/1997 | Abecassis | 348/110 |
| 5,812,204 | * 9/1998 | Baker et al. | 348/453 |
| 5,953,074 | * 9/1999 | Reddy | 348/558 |
| 6,078,361 | * 6/2000 | Reddy | 345/558 |

* cited by examiner

Primary Examiner—Reinhard Eisenzopf
Assistant Examiner—Brian P. Yenke

(57) ABSTRACT

Apparatus for generating at least a selected area in a picture is disclosed herein. The picture and the selected area are displayed on a video display means, and the user can optionally adjust the position and size of the selected area. The apparatus including the following devices. A first converting device that is used to generate a digital signal and a pointer defining signal according to a computer video signal. The picture is transferred from the computer video signal, and the selected area is defined in the pointer defining signal. A first adapting device that is utilized to adapt the format of the computer video signal to suit a digital display format corresponding to the pointer defining signal. A storage device determines said display timing of all the pixels of the picture. A pointer generating device generates a plurality of edge of the selected area according to the pointer defining signal. The pointer generates device defines the color and brightness of all the pixels of the picture and the selected area, and the plurality of edge of the selected area can be moved dynamically according to the pointer defining signal. A second converting device converts the output signal of the pointer generating device to an analog form corresponding to the pointer defining signal. A second adapting device adapts the converted output signal of the pointer generating device to suit an analog display format, the signal processed by the video display device being of the analog display format.

15 Claims, 4 Drawing Sheets

APPARATUS FOR CONVERTING VIDEO SIGNAL

BACKGROUND OF THE INVENTION

1. Field of the Invention

This invention relates generally to a video presentation tool, and more particularly, relates to a presentation apparatus for converting a computer video signal to a video signal.

2. Description of the Prior Art

Nowadays, the computer is frequently used for processing many kinds of data, and it is also necessary to show the data on a display device having a large screen in a presentation. The data may be a picture, a photograph or a document. The configuration of the traditional converting device used with the computer and the video display device is shown in FIG. 1, in which the data of the analog display format is transmitted from the personal computer 10 to the converting device 11. Because the signal displayed by the monitor must be an analog format, the data is transformed to the analog display format by the personal computer 10. The converted data is then transmitted to the monitor 13 of the personal computer 10 by the converting device 11, and transformed into a video format signal simultaneously. The aforementioned video format signal is thus fed to the video display device 15 to illustrate the data. Because the traditional converting device using the traditional technologies can not process the data, the image shown on the display in the presentation is identical with the image on the monitor of the computer used by presenter. The traditional converting device directly shows the data, which is transmitted from the computer to the monitor supported by the presenter.

According to the traditional converting device mentioned above, the point of the presenter can not be clearly expressed in the image on the display, the viewer in the presentation can hardly catch the idea of the presenter using the traditional converting devices. In order to solve the problems mentioned above, some kinds of programs in the personal computer 10, such as Micro-soft power point, are designed and used to further process the data. Thus the presenter can use the functions such as zoom and pan or highlight a portion of data. Though the aforementioned functions can be applied when the traditional converting device is used, the compatibility between the software and the data is a problem. The format of most data is usually unacceptable for the presentation software. For example, if the data is a circuit diagram, a waveform, or a block diagram, the aforementioned functions can not be used. Moreover, the installation of the software is not convenient for the presenter. So the software designed for a presentation is not practical.

In the other type of the traditional converting devices, when the picture transferred from the data is enlarged, the picture is first divided into several portions. If the presenter wants to zoom in a portion of the picture, the presenter uses the remote controller of traditional converting device to select one portion of the picture, and the converting device enlarges the selected portion on the video display device. Because the divided portions are already determined in the converting device, the presenter can only highlight a portion of the picture according to the predetermined portions on the remote controller of the traditional converting device. In other words, the presenter must search for a while when he wants to show a portion of the picture, so the presentation is interrupted for a while. If the selected area that is to be zoomed can be highlighted first, it is easy for the presenter and the viewer to search for the selected area.

In addition, though the pointer can be used in a presentation to point out a position on the picture of the video display device, the presenter still has to purchase and bring the pointer. Furthermore, although the functions such as zoom and pan or other functions can be used in the prior art, however, the presenter can only select a portion of the picture according to the predetermined portions. In the traditional converting device, the picture converted from the data is divided into 9 portions, and the presenter can only select one of them to implement the functions such as zoom, pan or other functions.

In some applications, it is necessary to show different portions of a picture converted from the data, yet the presenter using traditional converting device can not illustrate an optional portion or more portions of the picture on the video display device. Thus the presenter is forced to change from a portion to the other portion of the picture, and the viewer may be confused. Furthermore, some presenter used to utilize projector can not accustomed to handle the personal computer and the converting device, because the presenter used to apply an opaque material to cover a partition of a slide to show the other partition of the image on the display. When the presenter wants to show more parts of the covered partition of the slide, the presenter can slowly pull down the opaque material to show more parts of the covered partition of the slide. The aforementioned functions can not be implemented in the traditional converting device, so it is inconvenient for the presenter that used to utilize the projector. In addition, the traditional converting device can not generate a light spot on the picture, so the presenter can not highlight an optional position on the display without a pointer.

For the mentioned above, there are some elementary disadvantages in the traditional converting device. At first, the traditional converting device can not show the edge of the selected area, no matter how many selected area are shown on the video display device. So the presenter can not highlight a selected area among a plurality of selected areas of a picture. Thus the presenter can not separately show the data in the different selected areas that is proceeded with different image process, such as inverting tone of color of pixel or brightness of pixel. So the viewer can not compare the image in the different selected area. In addition, the function of a pointer can not be installed in a traditional converting device. And the traditional converting device can not be used to imitate the action of a traditional projector.

SUMMARY OF THE INVENTION

Apparatus for generating at least a selected area in a picture is disclosed herein. The picture and the selected area are displayed on a video display means, and the user can optionally adjust the position and size of the selected area. The aforementioned apparatus according to the present invention including the following devices.

The first converting means controls the display timing of every pixel of the picture by converting a computer video signal from an analog form to a digital form. The first converting means generates a digital signal and a pointer defining signal. The picture is transferred from the computer video signal, and the selected area is defined in the pointer defining signal. The first adapting means adapts the format of the computer video signal to suit a digital display format corresponding to the pointer defining signal.

The storage means determines the display timing of all the pixels of the picture, and stores the computer video signal of the digital display format corresponding to the pointer defining signal. The storage means also outputs an adapted digital signal including every pixel of the picture. The pointer defining means defines the plurality of pixel at the frame on a plurality of edges of the selected area according to the pointer defining signal and the parameter setting signal. The pointer defining means output an control signal and defines the color and brightness of all the pixels of the picture and the selected area. The plurality of edge of the selected area can be moved dynamically according to the pointer defining signal.

The image processing means generates all the pixels of the picture, the color and brightness of all the pixels of the picture according to the adapted digital signal and the control signal. The second converting means converts the output signal of the pointer generating means to an analog form corresponding to the pointer defining signal. The second adapting means adapts the converted output signal of the pointer generating means to suit an analog display format. The signal processed by the video display means is of the analog display format.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Figure 1:
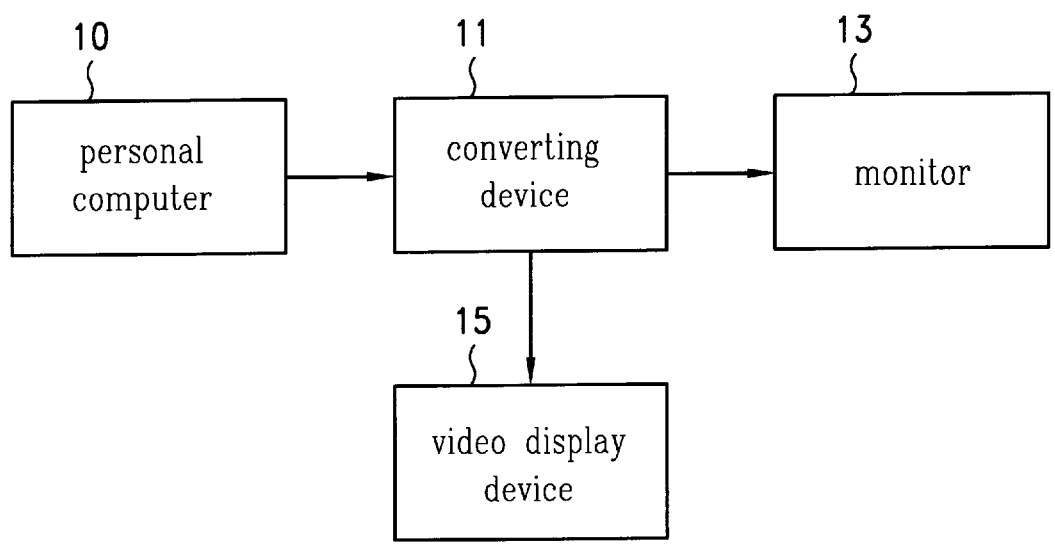
FIG. 1 illustrates the functional block diagram of the traditional converting device.
Figure 2:
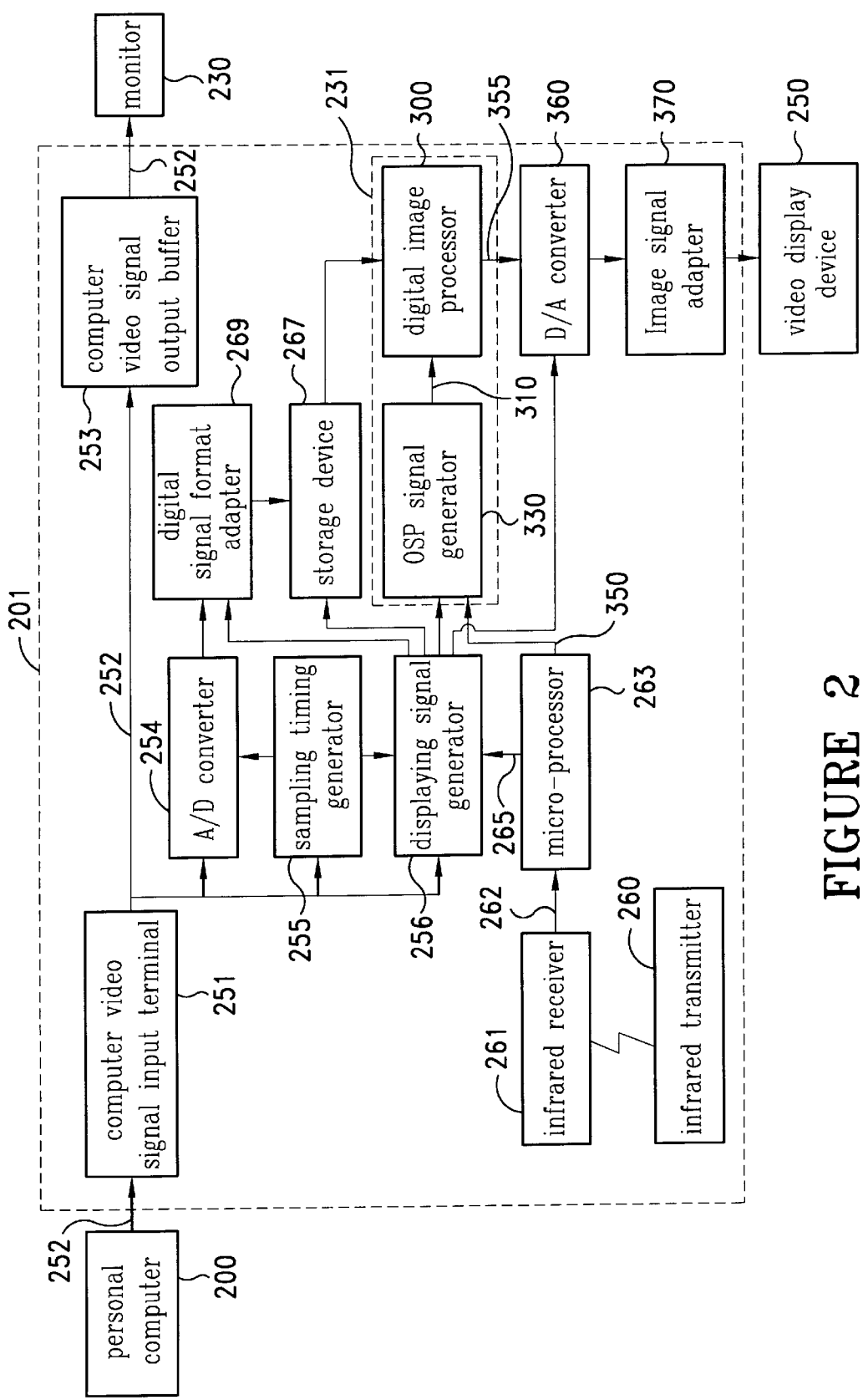
FIG. 2 illustrates the functional block diagram of the converting apparatus of the preferred embodiment according to the present invention.

To overcome the disadvantages mentioned in the traditional converting apparatus, the present invention provides an apparatus that can perform more functions. No matter the presenter wants to select one or a plurality of selected areas, the converting apparatus in the present invention can display the edge of the selected areas. So the presenter can emphasize the different selected areas by highlighting the edge of the selected areas on the picture. In addition, the different image processes inside and outside the selected area or between different selected areas are enabled in the converting apparatus according to the present invention. The aforementioned image process can be the traditional image processing such as inverse color tone of a pixel or the brightness of the pixel. Thus the viewer of a presentation can easily compare the image in the selected areas. In addition, the function of a pointer can be installed in converting apparatus according to the present invention. Furthermore, the converting apparatus can be used to imitate the action of a traditional projector. Certainly, the converting apparatus according to the present invention can perform traditional zoom functions such as zoom and pan, and area zoom. In addition a function OSP (On Screen Pointer) zoom is provided in the present invention. In one preferred embodiment according to the present invention, the configuration of the converting apparatus used with the computer and the video display device is the same as FIG. 1. The block diagram of the converting apparatus in the present invention used with the computer and the video display device is shown in FIG. 2. In which, the remote controller that transmitting infrared ray is also used in the converting apparatus according to the present invention.

The data transmitted by the personal computer 200 is routed to the converting apparatus 201. In one branch, the data is directly fed to the monitor 230 to show the picture converted from the data. In the other branch, the converting apparatus 201 processes the data transmitted by the personal computer 200 to produce a picture with the result generated by the function of the present invention. The devices of the functional blocks in the converting apparatus 201 are generally used in the prior art except the OSP (On Screen Pointer) image processor 231.

The data processed by the converting apparatus 201 are fed to the video display device 250 to show the image to the audience. Due to the OSP image processor 231 in the present invention, the presenter can form a light spot on an optional portion of the picture on the display without a pointer. The presenter can add the edge of one or more selected areas of the image; besides, the image processing in the present invention can be performed in the image inside the selected area. For example, in this embodiment, the image within the edge of the selected area can be zoomed. The aforementioned function is called OSP zoom.

Moreover, the presenter can select one or more areas on the image by adding the edge of the selected areas to show portions of the image. In addition, different type of image processing can be performed in different selected areas and outside the selected areas. Thus viewer in the presentation can easily tell the difference of the image within the selected areas. For example, the brightness of the pixels inside the selected area are set to be the original brightness, and the brightness of the pixels outside the selected areas are set to be one fourth of the original brightness. So the viewer in the presentation can easily figure out that which portion of the image is emphasized by the presenter. The other way to emphasize the different selected areas, the color of every pixels within the selected areas is set to be the same as the original image, and the pixels outside the selected areas is set to black. Meanwhile, different type of image processing can be performed within the selected areas. The aforementioned image processing can be the flicker of the image, the brightness adjustment, the contrast, and the color of the image.

When the presenter wants to show the image like using a projector as mentioned in the prior art, the presenter can set a nontransparent area covering one part of the image. Thus the presenter can reduce the region of black area gradually to imitate the slowly pulling down of the opaque material. In addition, the presenter can set the edge of the selected areas encloses a small area, thus the color of the edge full fill the selected area. As to the viewer in the presentation, the selected area is viewed as a point just alike a spot of light. The presenter controls the movement of the selected area to imitate the function of a real pointer. Besides, the button on the panel of either the converting apparatus or the remote controller can control the movement of the light spot. Consequently, the function of the pointer is adapted in the converting apparatus 201 according to the preferred embodiment of the present invention.

As shown in FIG. 2, the traditional devices of the functional blocks in the converting apparatus 201 except OSP image processor 231 are widely used in the prior art. The output signal of the personal computer 200 is used to display the picture converted from the data, so the output signal of the personal computer is an analog signal. The computer video signal input terminal 251 receives the computer video signal 252 from the personal computer 200, and the computer video signal input terminal 251 sends the computer video signal 252 to the computer video signal output buffer 253 directly. Next, the computer video signal output buffer 253 directly feed the computer video signal 252 to the monitor 230 to show the image.

In the other respect, the computer video signal 252 is fed to the A/D converter 254, the sampling timing generator 255, and the displaying signal generator 256 respectively. The output signal of the sampling timing generator 255 is a sequence of sampling timing pulse, which is fed to the A/D converter 254, and the displaying signal generator 256 respectively. Accordingly, the A/D converter 254 transforms the computer video signal 252 from an analog form to a digital form. When the presenter uses the remote controller to control the converting apparatus 201, the infrared transmitter 260 emits an infrared signal to the infrared receiver 261. Subsequently, the infrared receiver 261 receives the infrared signal and transmits a displaying-control signal 262 to the micro-processor 263.

Hence, the micro-processor 263 sends a displaying-control signal 265 to the displaying signal generator 256. The output signal of the personal computer 200 is the computer video signal 252, which is of the VGA format. Whereas the signal of the VGA format can not be displayed by the video display device, such as television. So it is necessary to control the parameter to adapt the signal of the VGA format to a format that can be displayed on the video display device 250. The displaying-control signal 262 is transmitted to the displaying signal generator 256 to adjust the parameter; thus the video display device 250, e.g. the television, can display the signal.

The digital signal format adapter 269 receives both the output signal of the A/D converter 254 and the displaying signal generator 256, thus the output signal of the digital signal format adapter 269 is fed to the storage device 267. Because the format of the computer video signal 252 is a VGA signal which is different from the format can be displayed in the television. It is necessary to use the digital signal format adapter 269 to change the format of the computer video signal 252 from a VGA format to a format available in the television, i.e., video format. Because the frequency and the characteristic of the computer video signal 252 are both different from that of the signal available in the television. If the digital signal format adapter 269 is absent, the image on the video display will flicker. In addition, the number of scanning line of the image on the monitor 230 is more than that of the image of the analog display format. Accordingly, the digital signal format adapter 269 compresses the computer video signal 252 to fit the number of scanning line of the video display device 250. The output signal of the adapter 269 and the displaying signal generator 256 are fed to the storage device 267, and the OSP image processor 231 receives the adapted digitized computer video signal from the storage device 267.

The position of the selected area stored in the storage device 267. The adapted digitized computer video signal 252 are sent to the digital image processor 300 of the OSP image processor 231, and the digital signal processing is processed therein. The digital image processor 300 processes the adapted digitized computer video signal according to the control signal 310 generated by the OSP signal generator 330. Actually, the scope as well as the position of the selected area are defined by the OSP signal generator 330 of the OSP image processor 231. The colors and the brightness of the pixels within the selected area(s) are included in the control signal 310.

Subsequently, the digital image processor 300 processes the adapted digitized computer video signal 252 according to the control signal 310, and the selected area(s) on the picture converted from the data is produced. When the presenter uses the remote controller to change the scope, position, color, brightness, and even the number of the selected area(s), the micro-processor 263 sends a parameter setting signal 350 to the OSP signal generator 330, thus the OSP signal generator 330 generates the control signal 310. The digital image processor 300 processes the adapted digitized computer video signal 252 according to the control signal 310 to produce a further processed data 355. The further processed data 355 represents a further processed image that having the selected area(s) on the picture converted from the data. The images within the selected area are all processed according to the setting of the presenter. The aforementioned image process can be the flicker of the pixel of the image, the brightness, the contrast, and the color of the image.

Figure 3:
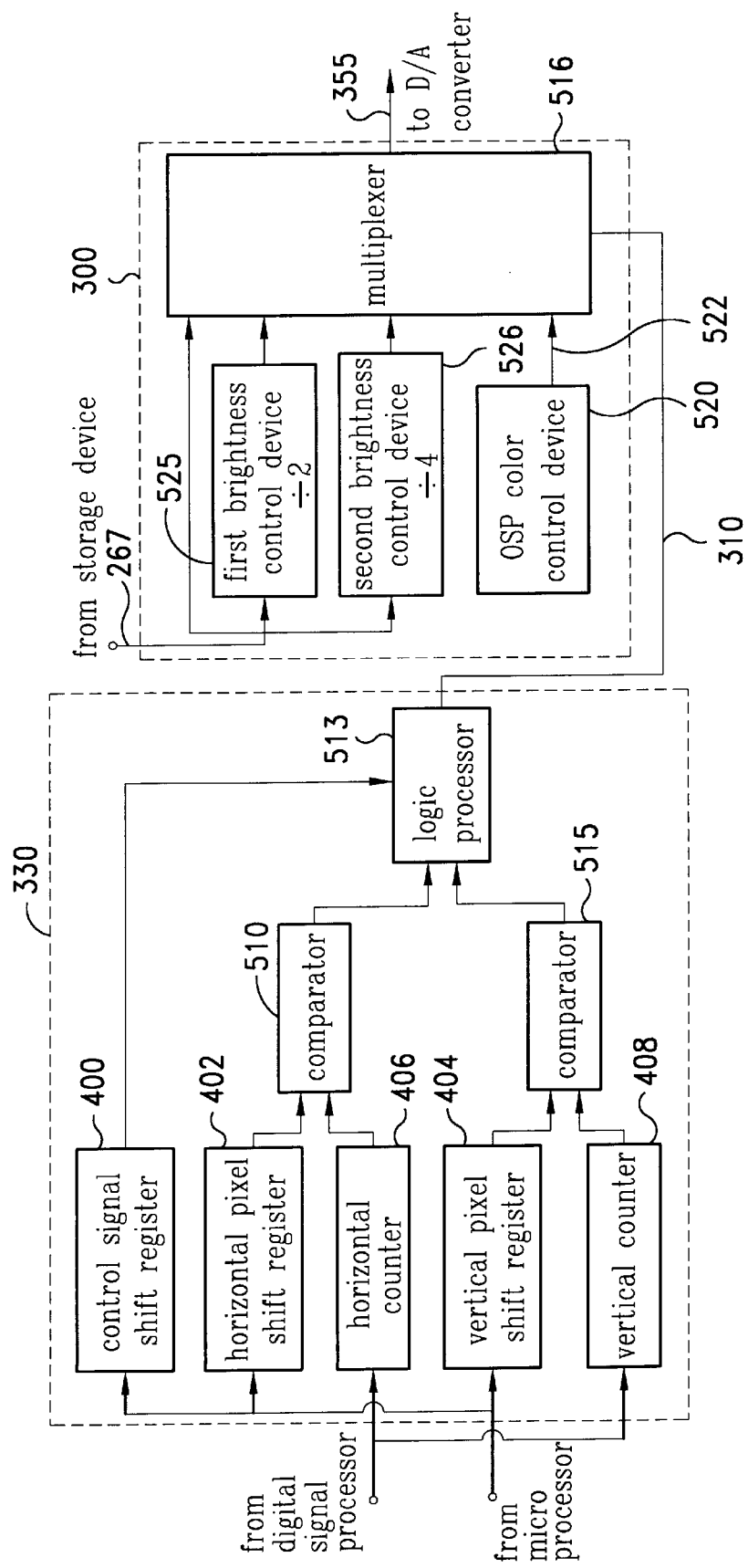
FIG. 3 illustrates the functional block diagram of the OSP (On Screen Pointer) image processor of the preferred embodiment according to a present invention.

The diagram of the functional blocks of the OSP image processor 231 according to the preferred embodiment of the present invention is detailed in FIG. 3. The OSP signal generator 330 is used to define the selected area(s) on the picture converted from the data. The parameter setting signal 350 (FIG. 2) includes the color together with the brightness of the selected area, the color of the frame enclosing the selected area, and the position together with the scope of the selected area. When a rectangular selected area is selected, referring to FIG. 3, the micro-processor 263 (FIG. 2) sends a parameter setting signal 350 (FIG. 2) to the OSP signal generator 330. In which, the color together with the brightness of the selected area and the color of the frame enclosing the selected area are sent to the control signal shift register 400 (FIG. 3).

Figure 5:
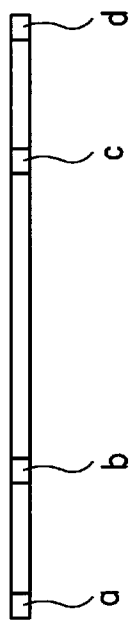
FIG. 5 illustrates the structure of the scanning line of the picture on a video display device.
Figure 4:
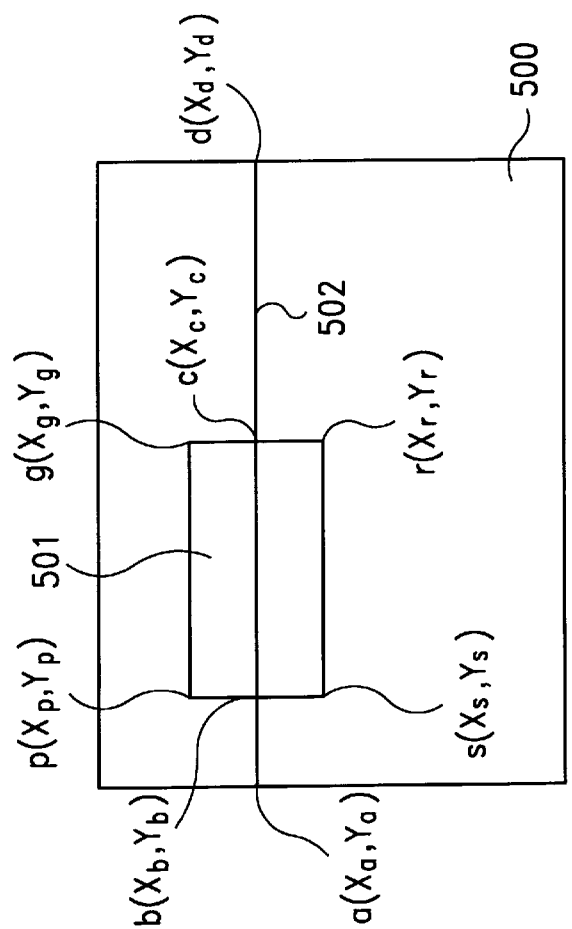
FIG. 4 shows that a rectangular selected area is formed on the optional position of the picture on the video display device.

The horizontal coordinate and the vertical coordinate of the points on the four angles of the frame of the selected rectangular area are stored in the horizontal pixel shift register 402 and the vertical pixel shift register 404 respectively. The displaying signal generator 256 sends a horizontal synchronous signal and a pixel clock to the horizontal counter 406, in addition, the displaying signal generator 256 sends the horizontal synchronous signal together with a vertical synchronous signal to the vertical counter 408. The horizontal synchronous signal and the vertical synchronous signal are respectively synchronous with the horizontal synchronous signal and the vertical synchronous signal of the video display device 250 (FIG. 2). The pixel clock is the timing of displaying the further data. When the further data is shown on the video display device 250 (FIG. 2), the picture 500 as shown in FIG. 4 is displayed on the screen of the video display device 250. The picture 500 is composed of many scanning lines that are composed of many pixels. Turning to FIG. 4, the selected rectangular area 501 is selected and displayed on the picture 500. As shown in FIG. 4, the scanning line 502 starts at point A and ends at point D. The frame of the selected rectangular area 501 cross the scanning line 502 at point B and point C. The scanning line 502 crossing the selected rectangular area 501 is enlarged in FIG. 5, in which the structure of the scanning line 502 is also illustrated. Every point of the scanning line 502 is a pixel. The four points on the four angles of the frame of the selected rectangular area 501 are point P, Q, R, and S as shown in FIG. 4. The coordinate of the point P, Q, R, and S are (Xp,Yp), (Xq,Yq), (Xr,Yr), and (Xs,Ys) respectively. The coordinate of point A is (Xa,Ya), in which Xa represents the horizontal coordinate, and Ya represents the vertical coordinate. Similarly, the coordinate of point B, c, and d are (Xb,Yb), (Xc,Yc), and (Xd,Yd), respectively.

Turning to FIG. 3, the horizontal coordinates of the points P, Q, R, and S, i.e. Xp, Xq, Xr and Xs are stored in the horizontal pixel shift register 402. Similarly, the vertical coordinates of the points P, Q, R, and S, i.e. Yp, Yq, Yr and Ys are stored in the vertical pixel shift register 404. Please note that the horizontal coordinate of the point B is in a range between Xp, and Xq, and the vertical coordinate of point B is in a range between Yp and Ys. When the point B is displayed, the pixel clock in horizontal counter 406 is within the value stored in horizontal pixel shift register 402. Then the comparator 510 sends an enable signal to the logic processor 513. Similarly, the vertical synchronous signal in the vertical counter 408 is within the value stored in the vertical pixel shift register 404. And then the comparator 515 sends an enable signal to the logic processor 513. Thus the logic processor 513 receives the feature stored in the control signal shift register 400 and transmits a control signal 310 to the multiplexer 516.

The OSP (On Screen Pointer) color control device 520 sends an OSP color signal 522 to the multiplexer 516 according to the color setup in the control signal shift register 400. In addition, the multiplexer 516, the first brightness control device 525, and the second brightness control device 526 respectively utilize the data stored in the storage device 267. The brightness of the picture 500 is adjusted by the first brightness control device 525 and the second brightness control device 526 respectively. In the preferred embodiment, the brightness of the output signal of the first brightness control device 525 is twice than that of the brightness control device 526. The multiplexer 516 using the control signal 310 as a control signal to put through the output signal of the storage device 267, the first brightness control device 525, the second brightness control device 526, or the OSP color control device 520. When a pixel is to be displayed, the multiplexer 516 controlled by the control signal 310 output a pixel according to the setting of the control signal 310. For example, if the pixel is outside the selected rectangular area 501 and the brightness is set to be one fourth of the original brightness. The control signal 310 enables the multiplexer 516 to select the output signal of the second brightness control device 526 as the output signal of the multiplexer 516. When a pixel is on the frame at the edge enclosing the selected rectangular area 501, the multiplexer 516 controlled by the control signal 310 output a pixel according to the setting in the control signal 310. The control signal 310 enables the multiplexer 516 to select the output signal of the color control device 520 as the output signal of the multiplexer 516. At this occurrence, the color of the displayed pixel is defined in the output signal of the color control device 520, i.e., OSP color signal 522. When a pixel within the selected rectangular area is to be displayed, the multiplexer 516 controlled by the control signal 310 output a pixel according to the setting of the control signal 310. For example, if the pixel is inside the selected rectangular area 501 and the brightness is set to be the original brightness. The control signal 310 enables the multiplexer 516 to select the output signal of the storage device 267 as the output signal of the multiplexer 516. For the mentioned above, the output of the multiplexer 516, i.e. the further processed data 355 is converted to the picture shown in FIG. 4. In which the picture includes an image with a selected rectangular area and the flame at the edge enclosing the selected rectangular area.

Turning to FIG. 2, the D/A (Digital-to-Analog) converter 360 converts the further processed data 355 from a digital format to an analog format. Then the image signal adapter 370 transfers the format of the converted further data to suit the video display device 250. In other words, the image signal adapter 370 transfers a signal from a digital display format to a video display format. The video display device 250 can be a television, a LCD projector, a LCD display or any kinds of video display device.

As noted, the horizontal coordinate and the vertical coordinate of the pixels on the frame of the selected rectangular area are stored corresponding to the feature of the selected rectangular area stored in the control signal shift register 400. A plurality set of pixels representing various selected areas can be implemented in the preferred embodiment according to the present invention. For example, referring to FIG. 3, the coordinates of a first set of pixels and a second set of pixels are all stored according to an order in the horizontal pixel shift register 402 and the vertical pixel shift register 404. The first feature of the first set of pixels and the second feature of the second set of pixels are stored according to the aforementioned order in the control signal shift register 400. Thus the selected areas having different features can be displayed on the picture according to the respect feature of the selected rectangular areas.

Because the user can elect the pixels on the angels of the selected area, the scope of the selected area can be adjusted. When the pixels are near, the frame at the edge surrounding the selected rectangular areas full fill the selected rectangular area. So the selected rectangular area looks like a spot of light for viewer. Thus the present invention can imitate the function of a pointer.

In the aforementioned preferred embodiment according to the present invention, the signal input to the converting apparatus is generated by a personal computer, and the video display device 250 is a television. Whereas, in the other embodiment, the personal computer 200 can be replaced by a television, and the video display device 250 can be replaced by a monitor of a computer or a television. In the other embodiment, the image signal adapter 370 is used to transform a signal to a VGA format when the video display device 250 can be replaced by a television. In another embodiment, the personal computer is remained and the video display device 250 can be replaced by a monitor of a computer. The aforementioned embodiment can be easily obtained by those skilled in the art utilizing the modification of the preferred embodiment according to the present invention.

Although specific embodiments have been illustrated and described it will be obvious to those skilled in the art that various modification may be made without departing from the spirit which is intended to be limited solely by the appended claims.

What is claimed is:

1. Apparatus for generating at least a frame enclosing at least a selected area in a picture, said picture and said selected area being displayed on a video display means, a position, a color and a size of said frame enclosing said selected area can be optionally adjusted, a signal displayed by said video display means being of an analog display format said apparatus comprising:

first converting means for controlling a display timing of every pixel of said picture by converting a computer video signal from an analog form to a digital form, said first converting means generating a digital signal and a pointer defining signal, said picture being transferred from said computer video signal, said selected area being defined in said pointer defining signal;

first adapting means for adapting a format of said computer video signal to suit a digital display format corresponding to said pointer defining signal;

storage means for determining said display timing of all pixels of said picture, said storage means stores said computer video signal corresponding to said pointer defining signal, said storage means also outputs an adapted digital signal including every pixel of said picture;

pointer generating means for generating said frame at a plurality of edge of said selected area according to said pointer defining signal, said pointer generating means defines a plurality of colors and brightness of all said pixels of said picture and said selected area, said frame can be moved dynamically according to said pointer defining signal;

second converting means for converting an output signal of said pointer generating means to an analog form corresponding to said pointer defining signal; and second adapting means for adapting a converted output signal of said pointer generating means to suit said analog display format, wherein said first converting means comprises:

an analog to digital converter for converting said computer video signal from said analog form to said digital form;

a sampling timing generator for generating a sampling-timing sequence according to said computer video signal, said sampling-timing sequence being used for sampling said computer video signal in said analog to digital converter;

processing means for generating a display setting signal and a parameter setting signal according to a displaying-control signal, said processing means being provided to control a parameter used in a video display format; and displaying signal generating means for controlling said display timing of every said pixel of said picture by generating a displaying-timing sequence according to said display setting signal, said computer video signal and said sampling timing signal, said displaying signal generating means generates said pointer defining signal, said displaying-timing sequence being included in said pointer defining signals said displaying signal generating means being provided to control a feature including the number, position scope, color and brightness of said selected area.

2. The apparatus as claim 1, wherein said frame at said plurality of edges of said selected area composes a rectangular area.

3. Apparatus for generating at least a frame enclosing at least a selected area in a picture, said picture and said selected area being displayed on a video display means, a position, a color and a size of said frame enclosing said selected area can be optionally adjusted, a signal displayed by said video display means being of an analog display format said apparatus comprising:

first converting means for controlling a display timing of every pixel of said picture by converting a computer video signal from an analog form to a digital form, said first converting means generating a digital signal and a pointer defining signal, said picture being transferred from said computer video signal said selected area being defined in said pointer defining signal;

first adapting means for adapting a format of said computer video signal to suit a digital display format corresponding to said pointer defining signal;

storage means for determining said display timing of all pixels of said picture, said storage means stores said computer video signal corresponding to said pointer defining signal, said storage means also outputs an adapted digital signal including every pixel of said picture;

pointer generating means for generating said frame at a plurality of edge of said selected area according to said pointer defining signal, said pointer generating means defines a plurality of colors and brightness of all said pixels of said picture and said selected area, said frame can be moved dynamically according to said pointer defining signal;

second converting means for converting an output signal of said pointer generating means to an analog form corresponding to said pointer defining signal; and second adapting means for adapting a converted output signal of said pointer generating means to suit said analog display format, wherein said pointer generating means comprises:

pointer defining means for defining said plurality of pixel at said frame of said selected area according to said pointer defining signal and said parameter setting signal, said pointer defining means outputs an control signal; and image processing means for generating all said pixels of said picture, said image processing means generating said color and brightness of all said pixels of said picture according to said adapted digital signal and said control signal.

4. The apparatus as claim 3, wherein said pointer defining means comprises:

a control signal shift register for defining said color and brightness of said pixels of said selected area according to said parameter setting signal;

a first position shift register for storing the position in a horizontal direction of said pixels at said plurality of edge of said selected area according to said parameter setting signal;

a first counter for counting the pixel from a first end of said picture to a second end of said picture in said horizontal direction according said displaying-timing sequence;

a second position shift register for storing the position in a vertical direction of the pixels at said frame of said selected area according to said parameter setting signal;

a second counter for counting the pixels from a third end of said picture to a fourth end of said picture in said vertical direction according said displaying-timing sequence;

a first comparator for filtering the pixels in said horizontal direction within said selected area;

a second comparator for filtering the pixels in said vertical direction within said selected area; and a logic processor for determining the brightness and color of the output pixel of said image processing means by outputting said control signal.

5. The apparatus as claim 3, wherein said image processing means comprises:

a plurality of brightness control devices for forming a plurality of pixels with at least two kinds of brightness;

a color control device for providing the color of said pixels surrounded by said plurality of edge of said selected area; and a multiplexer for combining the color and the brightness of all said pixels of said picture, said multiplexer selects one of said plurality of pixels according to said control signal, said control signal is a logic signal used to switch said multiplexer.

6. The apparatus as claim 1, wherein said second converting means comprises an digital to analog converter, said digital to analog converter processes the output signal of said image processing means according to said displaying-timing sequence.

7. The apparatus as claim 1, wherein said second adapting means comprises an image signal adapter, said image signal adapter adapts the format of the output signal of said digital to analog converter to said analog display format.

8. The apparatus as claim 1, wherein said video display means is chosen from a group consisting of a television, a LCD display, and a LCD projector.

9. Apparatus for generating at least a frame enclosing at least a selected area in a picture, said picture and said selected area being displayed on a video display means, a position, a color and a size of said frame enclosing said selected area can be optionally adjusted, a signal displayed by said video display means being of an analog display format said apparatus comprising:

first converting means for controlling a display timing of every pixel of said picture by converting a computer video signal from an analog form to a digital form, said first converting means generating a digital signal and a pointer defining signal, said picture being transferred from said computer video signal, said selected area being defined in said pointer defining signal;

first adapting means for adapting the format of said computer video signal to suit a digital display format corresponding to said pointer defining signal;

storage means for determining said display timing of all the pixels of said picture, said storage means stores said computer video signal of said digital display format corresponding to said pointer defining signal, said storage means also outputs an adapted digital signal including every pixel of said picture;

pointer defining means for defining said plurality of pixel at a plurality of edge of said selected area according to said pointer defining signal and said parameter setting signal, said pointer defining means outputting an control signal and defining the color and brightness of all the pixels of said picture and said selected area, said plurality of edge of said selected area can be moved dynamically according to said pointer defining signal;

image processing means for generating all the pixels of said picture, said image processing means generating the color and brightness of all the pixels of said picture according to said adapted digital signal and said control signal;

second converting means for converting the output signal of said pointer generating means to an analog form corresponding to said pointer defining signal; and second adapting means for adapting the converted output signal of said pointer generating means to suit said analog display format, wherein said first converting means comprises:

an analog to digital converter for converting said computer video signal from an analog form to a digital form;

a sampling-timing generator for generating a sampling-timing sequence according to said computer video signal, said sampling-timing sequence being used for sampling said computer video signal in said analog to digital converter;

processing means for generating a display setting signal and a parameter setting signal according to a displaying-control signal, said processing means being provided to control a parameter used in a video display format; and displaying signal generating means for controlling said display timing of every said pixel of said picture by generating a displaying-timing sequence according to said display setting signal, said computer video signal and said sampling timing signal, said displaying signal generating means generates said pointer defining signal, said displaying-timing sequence being included in said pointer defining signal, said displaying signal generating means being provided to control a feature including the number, position, scope color and brightness of said selected area.

10. The apparatus as claim 9, wherein said plurality of edge of said selected area composes a rectangular area.

11. Apparatus for generating at least a frame enclosing at least a selected area in a picture, said picture and said selected area being displayed on a video display means, a position, a color and a size of said frame enclosing said selected area can be optionally adjusted, a signal displayed by said video display means being of an analog display format said apparatus comprising:

first converting means for controlling a display timing of every pixel of said picture by converting a computer video signal from an analog form to a digital form, said first converting means generating a digital signal and a pointer defining signal, said picture being transferred from said computer video signal, said selected area being defined in said pointer defining signal;

first adapting means for adapting the format of said computer video signal to suit a digital display format corresponding to said pointer defining signal;

storage means for determining said display timing of all the pixels of said picture, said storage means stores said computer video signal of said digital display format corresponding to said pointer defining signal, said storage means also outputs an adapted digital signal including every pixel of said picture;

pointer defining means for defining said plurality of pixel at a plurality of edge of said selected area according to said pointer defining signal and said parameter setting signal, said pointer defining means outputting an control signal and defining the color and brightness of all the pixels of said picture and said selected area, said plurality of edge of said selected area can be moved dynamically according to said pointer defining signal;

image processing means for generating all the pixels of said picture, said image processing means generating the color and brightness of all the pixels of said picture according to said adapted digital signal and said control signal;

second converting means for converting the output signal of said pointer generating means to an analog form corresponding to said pointer defining signal; and second adapting means for adapting the converted output signal of said pointer generating means to suit said analog display format, wherein said pointer defining means comprises:

a control signal shift register for defining the color and brightness of the pixels of said selected area according to said parameter setting signal;

a control signal shift register for defining the color and brightness of the pixels of said selected area according to said parameter setting signal;

a fist position shift register for storing the position in a horizontal direction of the pixels at said plurality of edge of said selected area according to said parameter setting signal;

a first counter for counting the pixel from a first end of said picture to a second end of said picture in said horizontal direction according said displaying-timing sequence;

a second position shift register for storing the position in a vertical direction of the pixels at said plurality of edge of said selected area according to said parameter setting signal;

a second counter for counting the pixel from a third end of said picture to a fourth end of said picture in said vertical direction according said displaying-timing sequence;

a first comparator for filtering the pixels of the position in said horizontal direction within said plurality of edge of said selected area;

a second comparator for filtering the pixels of the position in said vertical direction within said plurality of edge of said selected area; and a logic processor for determining the brightness and color of the output pixel of said image processing means by outputting a control signal.

12. Apparatus for generating at least a frame enclosing at least a selected area in a picture, said picture and said selected area being displayed on a video display means, a position, a color and a size of said frame enclosing said selected area can be optionally adjusted, a signal displayed by said video display means being of an analog display format said apparatus comprising:

first converting means for controlling a display timing of every pixel of said picture by converting a computer video signal from an analog form to a digital form, said first converting means generating a digital signal and a pointer defining signal, said picture being transferred from said computer video signal, said selected area being defined in said pointer defining signal;

first adapting means for adapting the format of said computer video signal to suit a digital display format corresponding to said pointer defining signal;

storage means for determining said display timing of all the pixels of said picture, said storage means stores said computer video signal of said digital display format corresponding to said pointer defining signal said storage means also outputs an adapted digital signal including every pixel of said picture;

pointer defining means for defining said plurality of pixel at a plurality of edge of said selected area according to said pointer defining signal and said parameter setting signal, said pointer defining means outputting an control signal and defining the color and brightness of all the pixels of said picture and said selected area said plurality of edge of said selected area can be moved dynamically according to said pointer defining signal;

image processing means for generating all the pixels of said picture, said image processing means generating the color and brightness of all the pixels of said picture according to said adapted digital signal and said control signal;

second converting means for converting the output signal of said pointer generating means to an analog form corresponding to said pointer defining signal; and second adapting means for adapting the converted output signal of said pointer generating means to suit said analog display format, wherein said image processing means comprises:

a plurality of brightness control device for forming a plurality of pixel of various brightness;

color control device for providing the color of the pixels surrounded by said plurality of edge of said selected area; and a multiplexer for combining the color and the brightness of all pixels of said picture, said multiplexer selects one of said plurality of pixel of various brightness according to said control signal, said control signal is a logic signal used to switch said multiplexer.

13. The apparatus as claim 9, wherein said second converting means comprises an digital to analog converter, said digital to analog converter processes the output signal of said image processing means according to said displaying-timing sequence.

14. The apparatus as claim 9, wherein said second adapting means comprises an image signal adapter, said image signal adapter adapts the format of the output signal of said digital to analog converter to said analog display format.

15. The apparatus as claim 9, wherein said video display means is chosen from a group consisting of a television, a LCD display, and a LCD projector.

* * * * *